United States Patent [19]

Merz

[11] Patent Number: 4,679,149
[45] Date of Patent: Jul. 7, 1987

[54] COMMISSIONING SYSTEM

[75] Inventor: Arthur Merz, Bad Hersfeld, Fed. Rep. of Germany

[73] Assignee: Siemens Aktiengesellschaft, Munich, Fed. Rep. of Germany

[21] Appl. No.: 707,569

[22] Filed: Mar. 4, 1985

[30] Foreign Application Priority Data

Mar. 5, 1984 [DE] Fed. Rep. of Germany ....... 3408081

[51] Int. Cl.⁴ .............................................. G06F 15/24
[52] U.S. Cl. .................................. 364/478; 235/375; 364/513; 414/273; 901/7
[58] Field of Search ... 364/478, 403, 513, 200 MS File, 364/900 MS File; 235/375, 385; 414/273, 274, 730; 901/6, 7, 46, 47, 50

[56] References Cited

U.S. PATENT DOCUMENTS

| | | | |
|---|---|---|---|
| 4,141,078 | 2/1979 | Bridges, Jr. et al. | 364/403 X |
| 4,176,996 | 12/1979 | Oku | 414/273 |
| 4,336,589 | 6/1982 | Smith et al. | 364/403 |
| 4,373,185 | 2/1983 | Mills et al. | 364/478 |
| 4,514,815 | 4/1985 | Anderson | 235/385 X |

Primary Examiner—Joseph Ruggiero
Attorney, Agent, or Firm—Kenyon & Kenyon

[57] ABSTRACT

An automatic commissioning system, in which the articles to be wharehoused are provided with a machine readable coding. On the transport unit for the articles a robot is arranged which grabs the articles, swings them in front of a concurrently transported code reading device which determines the destination address. The articles are then deposited in the addressed rack compartment.

4 Claims, 8 Drawing Figures

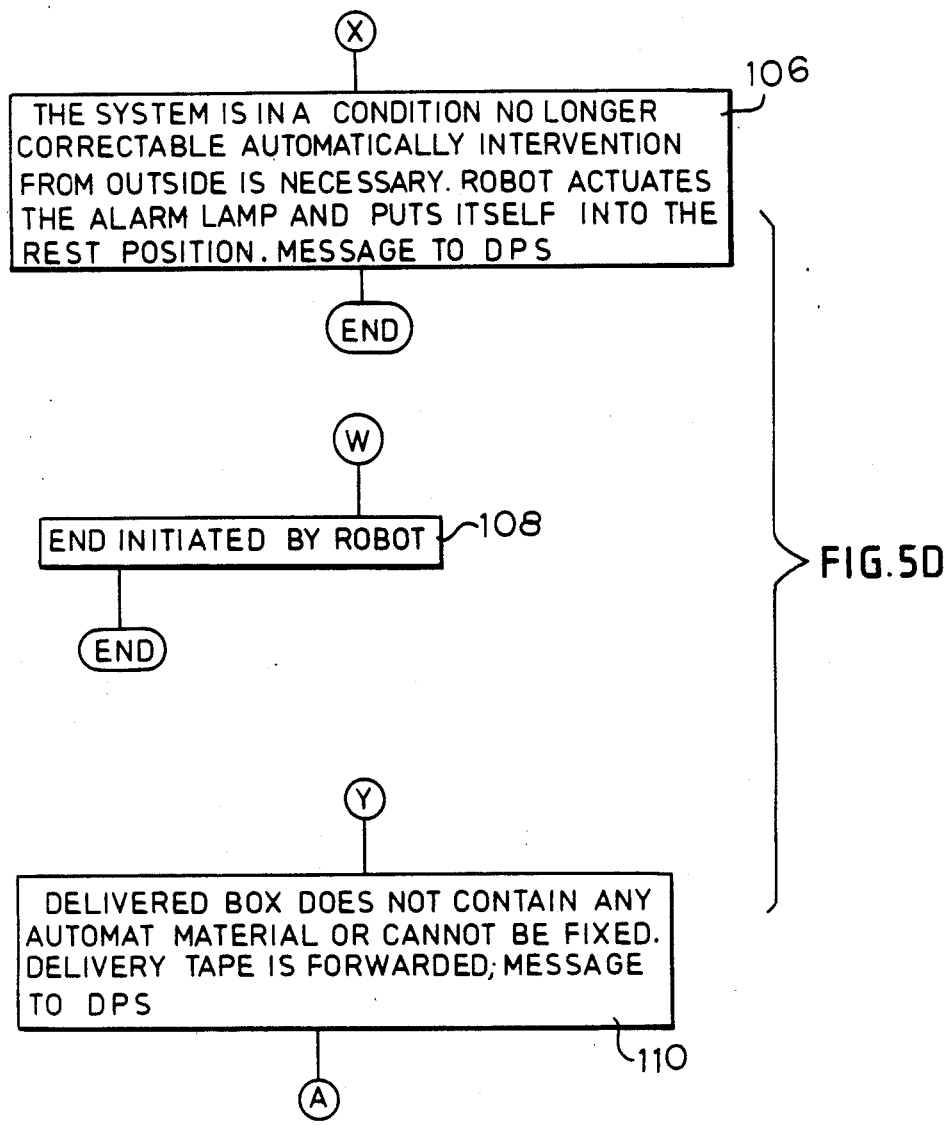

COMMISSIONING SYSTEM

BACKGROUND OF THE INVENTION

The present invention relates to commissioning systems in general, and more particularly to simpler and more efficient systems of this type.

Commissioning systems which include a transport unit for loading the compartments of a rack with individual articles, which articles are provided with machine readable coding, and which include code readers and computers for the distribution of the articles are known.

The generic term commissioning system includes a system such as is described, for instance, in DE-OS No. 27 36 197. In this known arrangement, the articles are provided with a machine readable label which is interrogated at individual deposition points. The processes are controlled centrally from a computer.

Computer controlled commissioning systems and material distribution arrangements, optionally in connection with readable coding, are also described in German Pat. No. 30 36 293 and in U.S. Pat. No. 4,336,589.

A package distribution system ("Elektronik", August, 1983, pages 95 to 98), in which the packages provided with labels come into the reading field of an optical sensor is also known. The sensor recognizes the orientation of the package, reads the label and transfers these data to the control of the robot. The robot grabs the package and deposits it in a defined position on one of three pallets. In the above-mentioned article, in connection with other applications, the fact that the robot itself could bring the information carrier into the range of the sensor is also discussed.

The object of the present invention is to develop a commissioning arrangement of the type mentioned at the outset in such a manner that a multiplicity of delivered articles can be distributed as quickly as possible to individual rack compartments without the need for particularly high costs for identification devices.

SUMMARY OF THE INVENTION

According to the present invention, this problem is solved in the following manner:

1. An industrial robot, a code reader and a receptacle for a multiplicity of articles with readable coding are arranged transportable together on the transport unit;

2. Upon a control command, the industrial robot grabs one of the articles from the loaded receptacle and turns it so that its coding is in front of the code reader;

3. From the coding which is read, a travel command for the transport unit to a respective deposition compartment is derived;

4. Simultaneously with the execution of the travel command, the coding which was read is transferred to a data processing system;

5. After the travel command is executed and the destination address, which is determined by the data processing system on the basis of plausibility, is received, the industrial robot deposits the grabbed material in the respective compartment; and 6. This control cycle is repeated until a predetermined number of articles is taken from the receptacle, whereupon the transport unit with its receptacle device travels to a loading station.

In this above-mentioned solution, it is essential that a multiplicity of the articles to be distributed and the identification system required therefor are transported simultaneously with the mechanical distribution means, namely, the robot. In this manner only one code reader is required and, nevertheless, very fast action with respect to the distribution is possible because it is not necessary that the robot return to a stationary reading station for each identification process.

In order to be able to recognize possible disturbances and the loading state of the system, it is of advantage if the industrial robot is provided, in a well-known manner, with sensors, by which for instance, the receptacle, the deposition compartments and articles to be deposited can be controlled.

If a container is used as the receptacle, the respectively emptied container is advantageously exchanged at the loading station for a filled container. The grabbing process can be made particularly simple for the robot if a defined arrangement of the articles to be grabbed is already established in the container, for instance, in the form that paper bags which are hung in a box-shaped container at defined spacings are used as the articles. These paper bags in turn can then be loaded with a multiplicity of individual small parts.

BRIEF DESCRIPTION OF THE DRAWINGS

FIGS. 5a-d comprise a flow diagram for the operation of the robot control unit.

DETAILED DESCRIPTION

Figure 1:
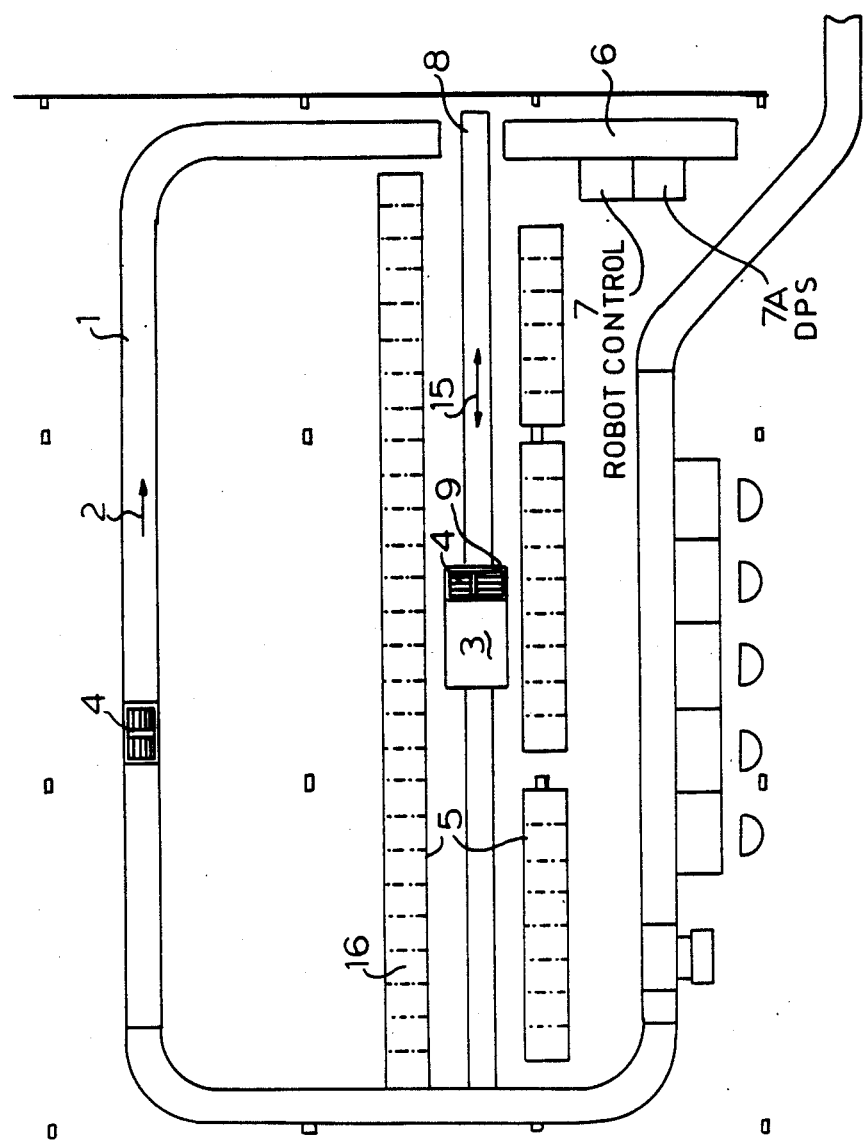
FIG. 1 is an overall plan view of a commissioning system according to the present invention.
Figure 2:
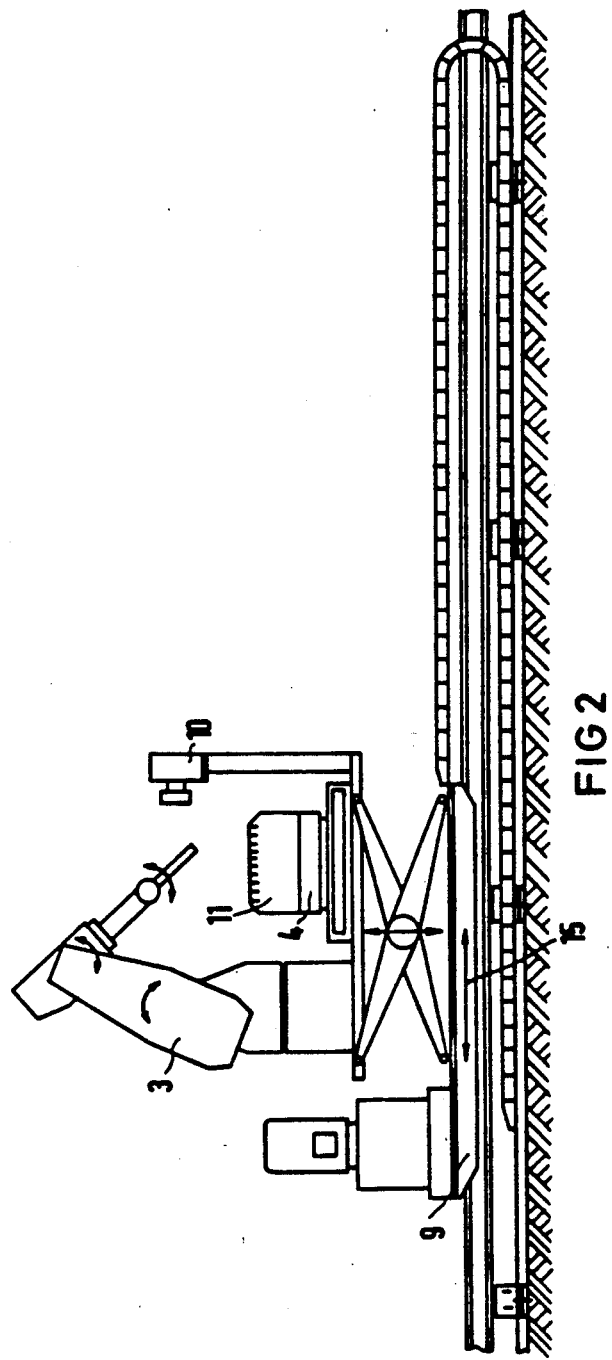
FIG. 2 is a schematic view of transport units with robot and material containers.

As can be seen from FIG. 1, boxes 4 filled with the paper bags to be warehoused are delivered on a delivery belt 1 in the direction of the arrow 2. At a transfer point 8, these boxes 4 are transferred to a linear transport unit 9 (see FIG. 2), on which an industrial robot 3 with a pressure sensor and a code reading device 10 is also arranged. After a filled box 4 is detected, checked and fastened on the transport unit and its position adjusted, the grabber of the robot 3 is positioned in the box 4 and approaches the first paper bag position, i.e., the first point at which the paper bag 11 can be expected to be. If a sensor for this paper bag responds, this paper bag is quickly seized and brought into the field of view of the optical reading system 10, is read, and the corresponding data are fed to a stationary robot control unit (FIG. 1). Control unit 7 forms the destination address therefrom. The linear transport unit 9 with the robot 3 then travels, according to this destination address in the direction of the double arrow 15 to the predetermined address in the rows 5 of a rack.

In parallel with approaching the address position, the read coding is fed to a data processing system (DPS) 7A and evaluated therein likewise for forming the destination address.

If the read coding is plausible, the destination address determined therefrom is reported back to the robot control. After the address is received, if the address equals the pre-position address, the robot puts the paper bag in the pre-positioned rack compartment. If the address from the DPS is not equal to that predetermined, the data processing system sends the address of a compartment which is set aside for incorrectly designated articles, from which they can later be reassigned, to the robot control. After the address is received, the linear unit travels to the incorrect compartment and the robot deposits the paper bag in this special compartment.

Figure 4:
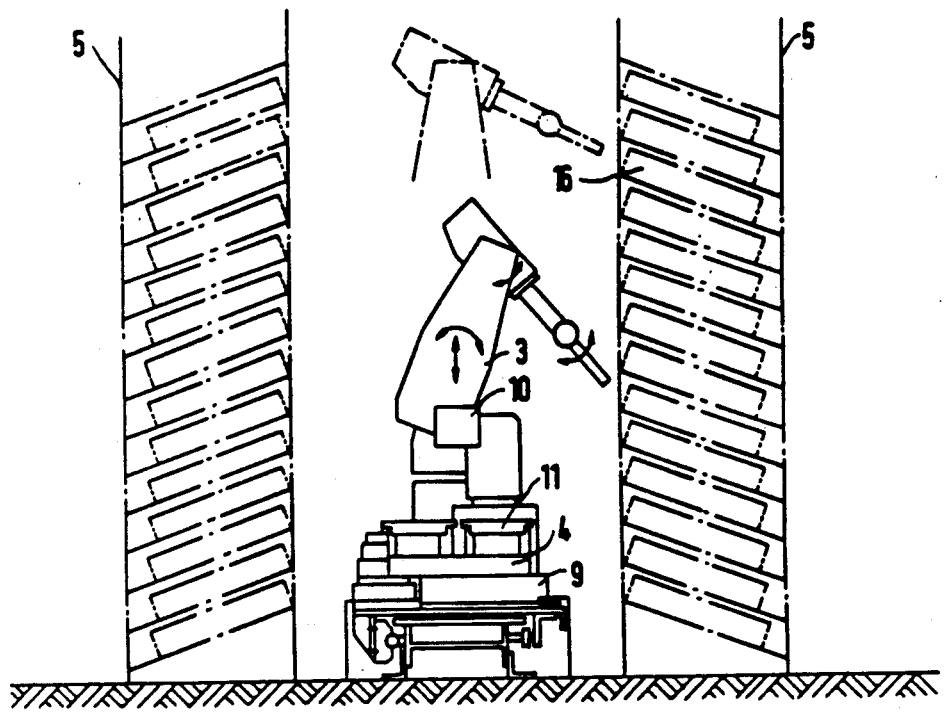
FIG. 4 illustrates the transport unit in the rack lane.

For positioning the travel of the transport unit and the robot in accordance with predetermined travel commands, known travel distance measuring systems and controls can be used such as described in the aforementioned references. If the robot with the material held therein has arrived in front of the correct deposition compartment 16, the grabber with the material enters the deposition compartment, for instance, a box. (See FIG. 4) If the pressure sensor responds in the process, the grabber is shifted by a defined amount and is repositioned; if then the sensor responds again in this position, this is an indication that the deposition compartment in question is full. Further, deposits to this position are accordingly prevented by the data processing system until the clearing of the compartment in question is reported.

If, however, the deposition position for the material held by the grabber is reached, without response by the force sensor, the grabber of the robot 3 is opened and the paper bag 11 to be warehoused is deposited.

As long as paper bags remain in the delivery box 4, the above-described process is repeated. When the delivery box is empty, the robot 3 travels with the transport device 9 back to the transfer position 8 and exchanges the empty box 4 for a new, full box 4.

Figure 3:
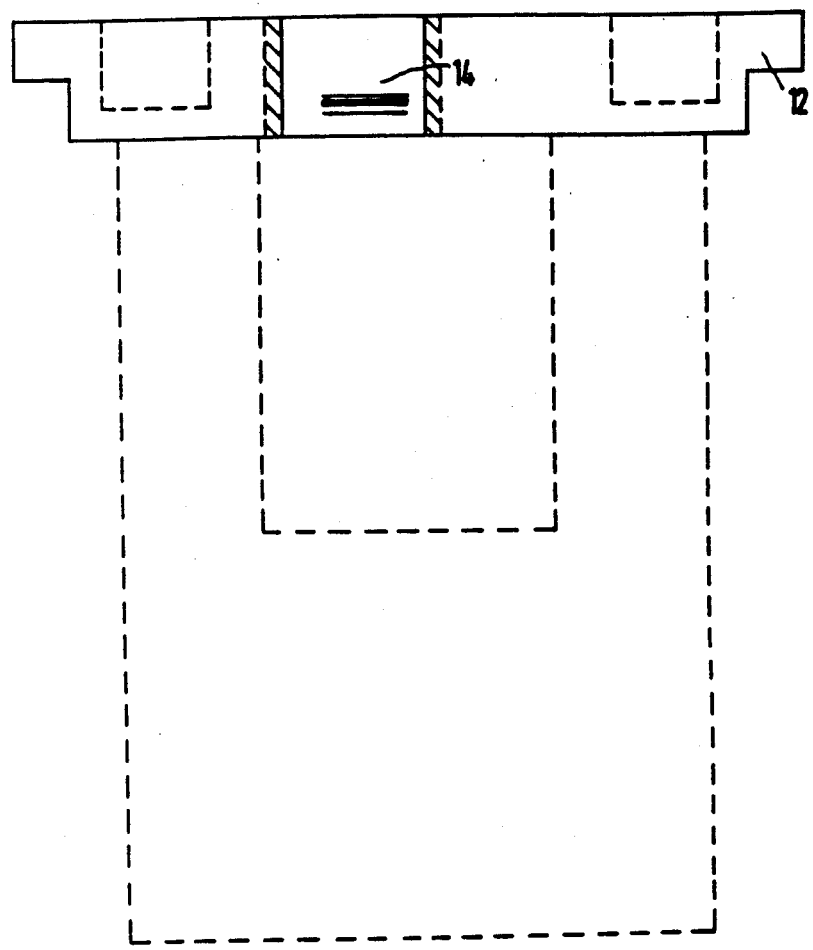
FIG. 3 illustrates the articles to be distributed in the form of a paper bag provided with coding.

The articles to be distributed in the present case (see FIG. 3) consist of paper bags which are filled, for instance, with components. The paper bags are sealed with cardboard strips 12 which serve at the same time as suspension axes for the delivery boxes 4. For identifying the paper bags, collective call-up strips 14 are provided which are cemented to the cardboard strips. These collective call-up strips contain a machine readable identification code portion, according to which a paper bag can be correlated unambiguously to an order. The strip 14 is provided with a position identification code, so that the identification can be read automatically by the reading system. As already noted, these paper bags with the holding axes are hung at spacings in the delivery boxes.

The operation just described can be better seen with reference to FIGS. 5a-d. This represents the flow diagram of the software utilized in carrying out the present invention. The entry point for the program is at point A, labeled 101 in FIG. 5A. The first thing which occurs is that the robot 3 is moved to the transfer position. A check is then made to see if a box is in position on the conveyor belt using appropriate sensors. At the same time as the robot is moved to the transfer position, the conveyor belt will be activated to bring the box into position. If the box is not in position, then a check is made as indicated in block 107 to see if the time is greater than three minutes. If not, the program loops through the blocks 105 and 107. If three minutes is reached, and a box is not in position, then a termination of the commissioning process takes place as indicated, by exiting block 107 at W which, as seen from FIG. 5D leads to the termination of the process by the robot.

If the box does reach its proper position within three minutes, an appropriate sensor checks to make sure that the box is suitable for the process as indicated by block 109. If the box is not suitable, the program is exited through Y, and, as indicated by block 110 of FIG. 5D, an indication is given that this is not the proper material for use in the system and the conveyor belt is moved forward to bring the next box into position and the program re-entered at 101.

Once a suitable box is found, block 110 is entered. The box is adjusted into the proper position for picking up the material within it, and a check is made then in block 113 to insure that the fixing is ok. If it is not, i.e., meaning that the box cannot be fixed in position, again, the program exits through Y, the conveyor belt is advanced and the process starts again at block 101. Once a box is fixed in the proper position, the grip is moved into the box as indicated by block 115. The pressure sensor is used to confirm positioning within the box as indicated by decision block 117. Again, if the proper indication is not received, exit is through Y with the conveyor advanced and another box brought into position.

Assuming a proper response is obtained from the pressure sensor, the paper bag sensor then checks to see if a paper bag is available as indicated by the decision block 119. If it is not available, the arm is forwarded by one scanning field as indicated by block 121. If such advancing occurs to a point where the edge of the box is reached, the pressure sensor will respond and again, exit through Y will occur.

Figure 5A:
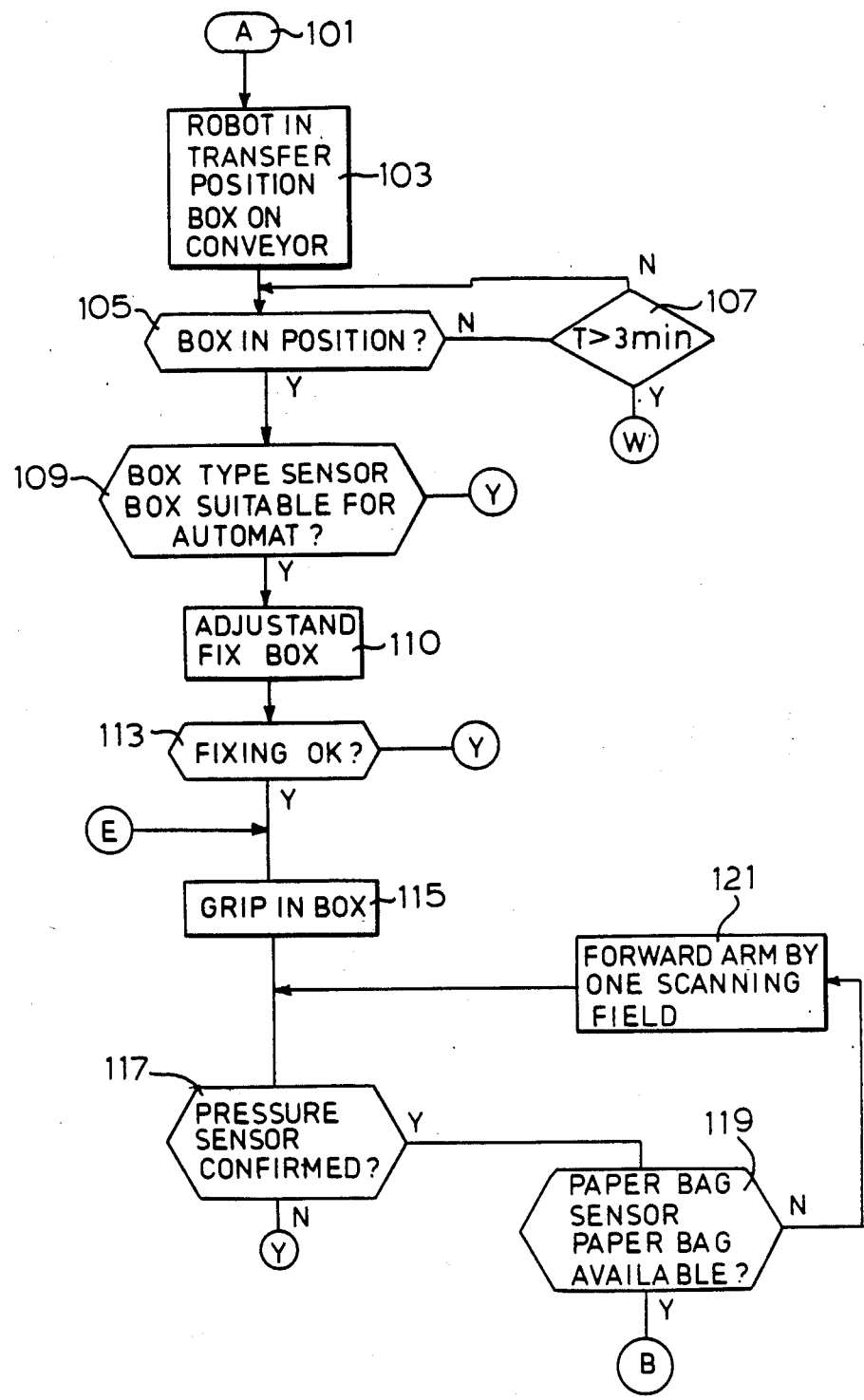
Figure 5B:
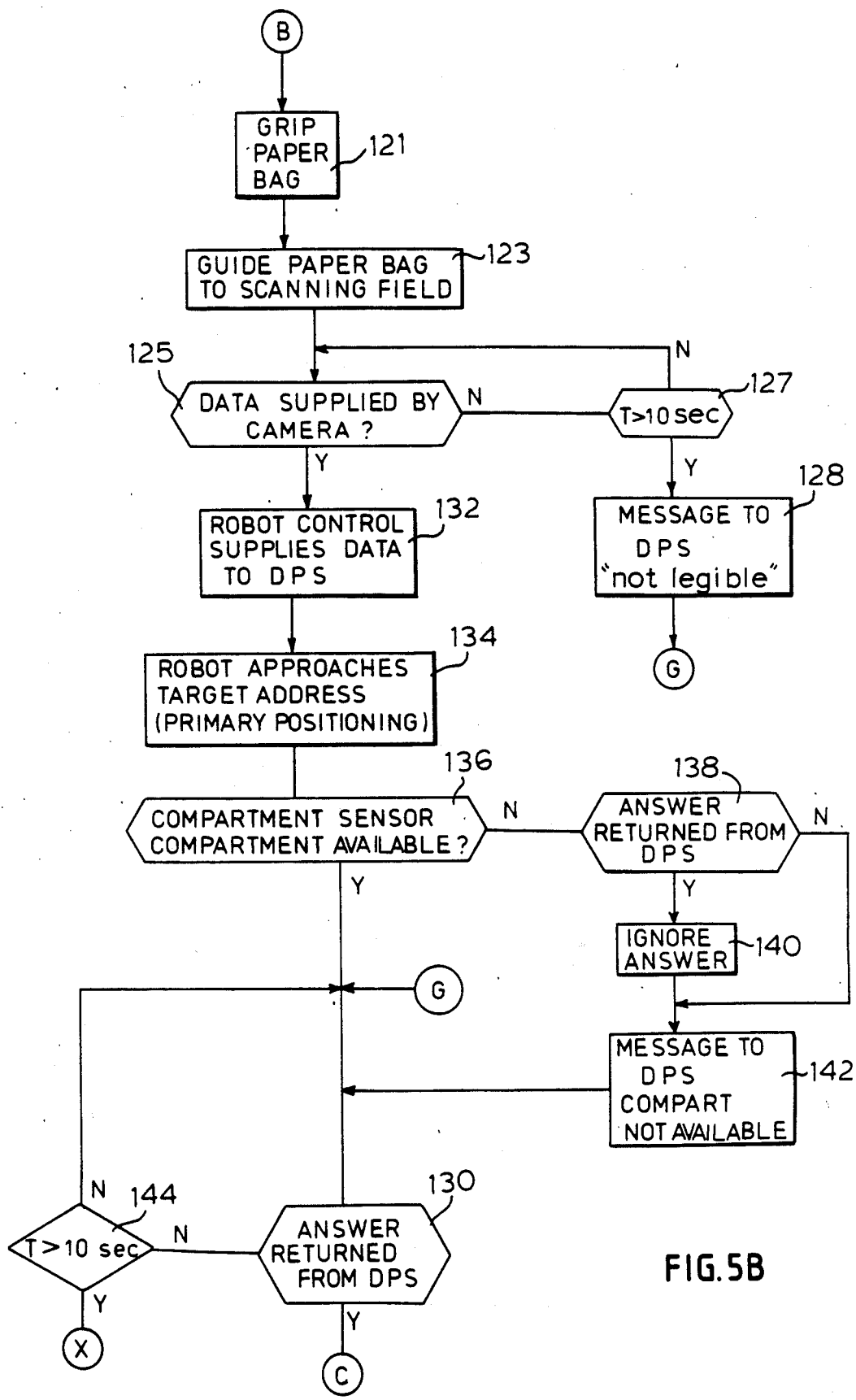

Once the paper bag sensor senses a paper bag is available, the program proceeds through B to the first block 121 of FIG. 5B. As indicated by that block, the gripper is caused to grip the paper bag and then as indicated by block 123, the paper bag is guided to the scanning field. In block 125 a check is made to see if data has been supplied by the camera. If it has not, the program moves through a ten second timer, indicated by decision block 127. If at the end of ten seconds, a signal still has not been supplied, block 128 is entered, sending a message to the data processing system that the material on the bag is "not legible." It then exits this block through G to a decision block 130 where it waits for an answer from the data processing system.

If data is supplied by the camera, then the robot control 7 supplies the data to the data processing system as indicated by the block 132. The robot begins to move toward the target address as determined from the data supplied. This is indicated by block 134. At this point, as indicated by decision block 136, the pressure sensor checks to see if there is a compartment available. If not, a check is made in block 138 to see if an answer has been received from the data processing system. If it has, the system ignores the answer as indicated by block 140. In either case, block 142 is entered and a message sent to the data processing system that a compartment is not available. Block 130 is then entered. In this case, or if the compartment sensor indicated that a compartment was available, a check is made to see if there has been an answer from the data processing system. Here again, a ten second timer is accomplished by means of decision block 144. If after ten seconds, there is not answer from the data processing system, then an exit is made by a X leading to block 146 of FIG. 5D. This indicates that the system is in a condition where it is no longer correctable automatically and intervention from the outside is necessary. The robot acuates an alarm lamp and puts itself in a rest position and sends a message to the data processing system to indicate this condition.

Figure 5C:
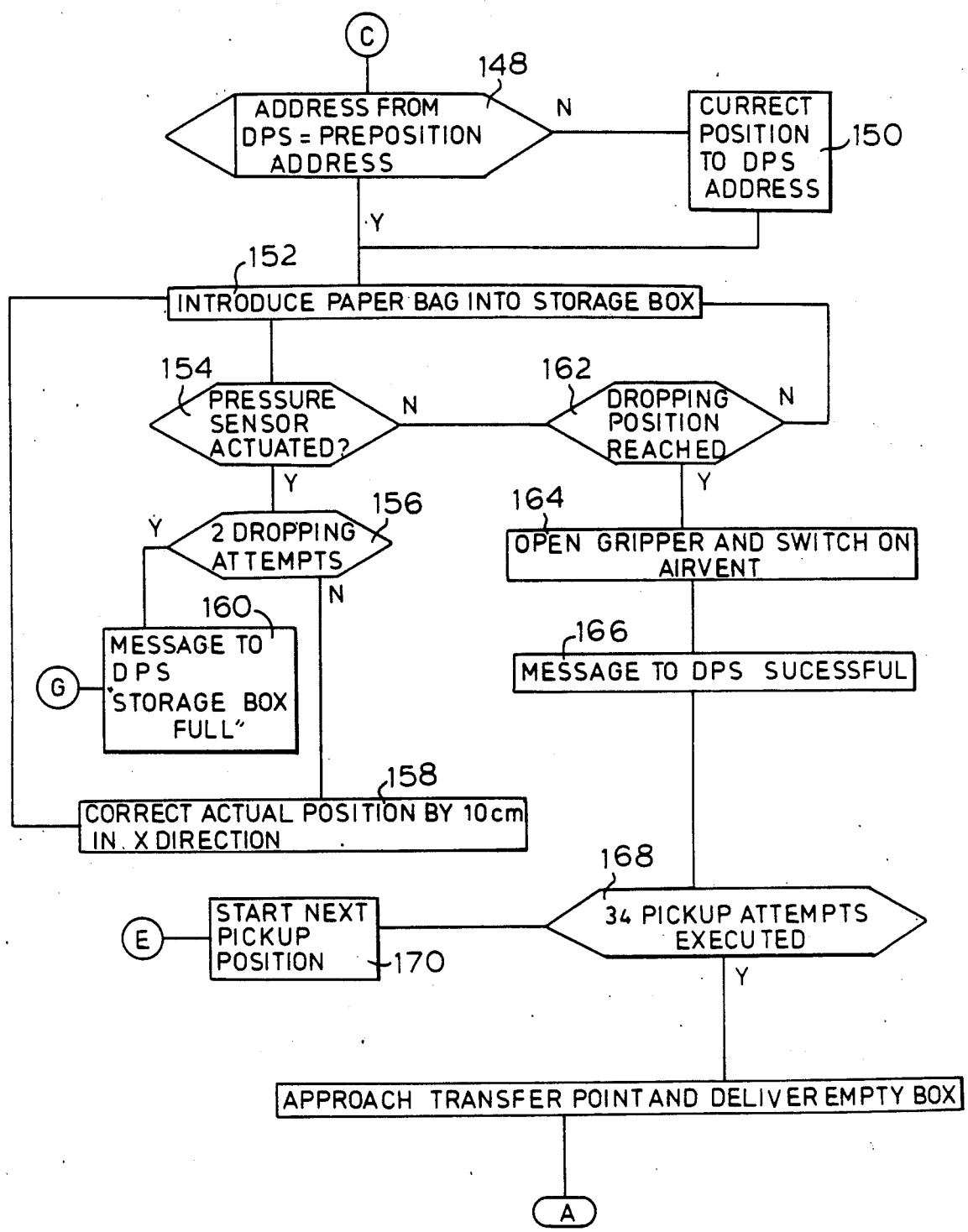

If an answer is received from the data processing system, then an exit through C is made and decision block 148 is of FIG. 5C is entered. Here the address from the data processing system is checked against the pre-position address. If the two addresses are not equal, the robot position is corrected to the data processing system address as indicated by block 150. If the address is correct or after correction, block 152 is entered and the paper bag is introduced into the storage compartment. If upon introduction, the pressure sensor is actuated, as indicated by decision block 154, a check is made to see if there two attempts at dropping have been made, as indicated by block 156. If not, the actual position is corrected by 10 cm in the x direction, as indicated by block 158, and another attempt made to introduce the paper bag into the storage box. After two unsuccessful attempts have been made, exit through block 160 to G takes place. A message is sent to the data processing system that the storage block is full and G leads back to FIG. 5B and into the decision block 130. That is to say the robot system awaits an answer from the data processing system. At this point the data processing system will, for example, instruct the robot to go to another position where the bag can be deposited and block 148 would be re-entered.

Once the paper bag is introduced into a storage compartment without the pressure sensor being actuated, as indicated by the "no" output of block 154, block 162 is entered where a check is made to see if the dropping position has been reached. If not, then the program loops back through blocks 152 and 154 until the dropping position has been reached. When it has, as indicated by block 164, the gripper is opened and an air vent switched on so as to cause the paper bag to be deposited in the storage compartment. This is followed by a message to the data processing system as indicated by block 166 that the deposition was "successful." A check is then made in block 168 to see if 34 pickup attempts have been executed, 34 pickup attempts being the number of bags in a box. If not, as indicated by block 170, a command is given to start the next pickup position and block 115 of FIG. 5a is again entered via E. Once 34 pickup attempts have been executed, the robot 3 moves to the pickup point 8 and delivers the empty box. The empty box will be pushed off onto the conveyor 6, as will boxes which are not proper for the system, as a new box is brought into position by the conveyor 1. The beginning of the program of FIG. 5A at A is again entered.

The program will continue, of course, as long as boxes are supplied on the conveyor. When boxes are no longer available, exit to block 108 via W will occur.

What is claimed is:

1. In a commissioning system including: a rack with deposition compartments; a transport unit for loading the deposition compartments with individual articles provided with machine readable coding; and code readers and computers for controlling the distribution of the articles, the improvement comprising:
   (a) the transport unit having disposed thereon and transportable therewith an industrial robot, a code reader and a receptacle for a multiplicity of said articles with readable coding;
   (b) a controller for said transport unit and robot;
   (c) said controller programmed to issue a command to said robot to cause it to grab one of the articles from said loaded receptacle and position it with its coding in front of said code reader;
   (d) said controller programmed to derive from the coding read, a travel command for the transport unit and the robot to a respective deposition compartment;
   (e) means for, simultaneously with the execution of the travel command, transferring the coding read to a data processing system;
   (f) said controller responsive to an output from said data processing system after the travel command is executed and a destination address is received, which is determined by the data processing system on the basis of plausibility, to cause the industrial robot to deposit the grabbed material in the respective compartment; and
   (g) said controller programmed to repeat the control cycle until a predetermined number of articles is taken from the receptacle and to then direct the transport unit with the receptacle device to travel to a loading station.

2. A commissioning system according to claim 1, wherein said receptacle comprises a container, in which the articles in the form of paper bags are suspended at defined spacings.

3. In a commissioning system including: a rack with deposition compartments; a transport unit for loading the deposition compartments with individual articles provided with machine readable coding; and code readers and computers for controlling the distribution of the articles, an improved method of operation comprising:
   (a) disposing on the transport unit, so as to be transportable therewith an industrial robot, a code reader and a receptacle for a multiplicity of said articles with readable coding; and
   (b) providing a programmable controller for said transport unit and robot, said controller programmed to:
      (i) issue a control to said robot to grab one of said articles from said loaded receptacle and position it with its coding in front of said code reader;
      (ii) derive, from the coding read, a travel command for the transport unit and command the robot to a respective deposition compartment;
      (iii) simultaneously with the execution of the travel command transfer the coding read to a data processing system;
      (iv) respond to an output from said data processing system after the travel command is executed and a destination address is received, which address is determined by the data processing system on the basis of plausibility, to cause the industrial robot to deposit the grabbed material in the respective compartment; and
      (v) repeat said control cycle until a predetermined number of articles is taken from the receptacle and then direct the transport unit with the receptacle device to travel to a loading station.

4. The method according to claim 3, wherein said receptacle comprises a container, in which the articles in the form of paper bags are suspended at defined spacings.

* * * * *